(12) United States Patent
Magnotta et al.

(10) Patent No.: US 9,896,571 B2
(45) Date of Patent: Feb. 20, 2018

(54) WATER-CLEAR ALIPHATIC POLYURETHANE PULTRUSION FORMULATIONS AND PROCESSES

(71) Applicant: Covestro LLC, Pittsburgh, PA (US)

(72) Inventors: Albert Magnotta, Monaca, PA (US); Stephen J. Harasin, Morgan, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 15/245,810

(22) Filed: Aug. 24, 2016

(65) Prior Publication Data

US 2016/0362540 A1 Dec. 15, 2016

Related U.S. Application Data

(62) Division of application No. 13/826,524, filed on Mar. 14, 2013.

(51) Int. Cl.

| | |
|---|---|
| *B29C 70/00* | (2006.01) |
| *C08G 18/32* | (2006.01) |
| *C08K 7/14* | (2006.01) |
| *C08K 3/40* | (2006.01) |
| *B29C 47/00* | (2006.01) |
| *C08G 18/48* | (2006.01) |
| *B29C 70/52* | (2006.01) |
| *C08G 18/75* | (2006.01) |
| *C08G 18/24* | (2006.01) |
| *C08G 18/76* | (2006.01) |
| *C08G 18/78* | (2006.01) |
| *C08G 18/79* | (2006.01) |
| *C08G 18/80* | (2006.01) |
| *C08J 5/04* | (2006.01) |
| *C08G 18/20* | (2006.01) |
| *B29K 75/00* | (2006.01) |
| *B29K 309/08* | (2006.01) |

(52) U.S. Cl.
CPC ............ *C08K 7/14* (2013.01); *B29C 47/0014* (2013.01); *B29C 70/52* (2013.01); *B29C 70/521* (2013.01); *B29C 70/527* (2013.01); *C08G 18/24* (2013.01); *C08G 18/3206* (2013.01); *C08G 18/3281* (2013.01); *C08G 18/3284* (2013.01); *C08G 18/482* (2013.01); *C08G 18/4804* (2013.01); *C08G 18/4816* (2013.01); *C08G 18/4829* (2013.01); *C08G 18/751* (2013.01); *C08G 18/758* (2013.01); *C08G 18/7664* (2013.01); *C08G 18/7831* (2013.01); *C08G 18/792* (2013.01); *C08G 18/8016* (2013.01); *C08J 5/04* (2013.01); *C08K 3/40* (2013.01); *B29K 2075/00* (2013.01); *B29K 2309/08* (2013.01); *C08G 18/2063* (2013.01); *C08J 2375/04* (2013.01); *C08J 2375/08* (2013.01)

(58) Field of Classification Search
CPC ..... B29C 70/52; B29C 70/521; B29C 70/527; C08G 18/482; C08G 18/4804; C08G 18/4816; C08G 18/751; C08G 18/758
See application file for complete search history.

(56) References Cited

U.S. PATENT DOCUMENTS

| | | | |
|---|---|---|---|
| 5,614,575 | A | 3/1997 | Kotschwar |
| 5,691,440 | A | 11/1997 | Katz et al. |
| 5,786,405 | A | 7/1998 | Schilling et al. |
| 6,420,493 | B1 | 7/2002 | Ryckis-Kite et al. |
| 6,793,855 | B2 | 9/2004 | Cheolas et al. |
| 7,056,976 | B2 | 6/2006 | Joshi et al. |
| 2004/0094859 | A1 | 5/2004 | Cheolas et al. |
| 2006/0173128 | A1* | 8/2006 | Connolly ............... B29C 70/521 524/589 |
| 2007/0098997 | A1 | 5/2007 | Younes et al. |
| 2007/0142607 | A1 | 6/2007 | Harasin et al. |
| 2007/0160793 | A1 | 7/2007 | Cageao et al. |
| 2008/0058468 | A1 | 3/2008 | Younes |
| 2008/0090966 | A1* | 4/2008 | Hayes ................ C08G 18/4812 525/123 |
| 2009/0023870 | A1* | 1/2009 | Berksoy ................ B29C 70/521 525/453 |

FOREIGN PATENT DOCUMENTS

WO 2007090259 A1 8/2007

OTHER PUBLICATIONS

Multranol 4050 Product Datasheet. Sep. 18, 2012.
Multranol 4050 Product Datasheet. Covestro. Aug. 28, 2015.

* cited by examiner

*Primary Examiner* — Michael L Leonard
(74) *Attorney, Agent, or Firm* — Donald R. Palladino

(57) ABSTRACT

Clear polyurethane fiber reinforced composites are produced by a pultrusion process with a polyurethane-forming system that includes: (a) a clear, aliphatic polyisocyanate having a viscosity at 25° C. of no more than 1000 centipoise, (b) a colorless polyol component comprising an amine-initiated polyol having a molecular weight of from about 150 to about 400 and an OH functionality greater than or equal to 3, and (c) a catalyst. These fiber-reinforced composites are characterized by both excellent weathering characteristics and excellent physical properties.

17 Claims, No Drawings

WATER-CLEAR ALIPHATIC POLYURETHANE PULTRUSION FORMULATIONS AND PROCESSES

CROSS REFERENCE TO RELATED APPLICATION

This application is a divisional of U.S. patent application Ser. No. 13/826,524, filed Mar. 14, 2013, which is incorporated herein by reference.

FIELD OF THE INVENTION

The present invention relates to aliphatic polyisocyanate formulations useful in pultrusion processes, and more specifically, to water-clear, aliphatic polyurethane formulations and pultrusion processes utilizing such formulations.

BACKGROUND OF THE INVENTION

Pultrusion is a manufacturing process for producing continuous lengths of fiber reinforced plastic ("FRP") structural shapes. Raw materials used in pultrusion processes include a liquid resin mixture (containing resin, fillers and specialized additives) and reinforcing fibers. The process involves pulling these raw materials, rather than pushing as is the case in extrusion, through a heated steel forming die using a continuous pulling device. The reinforcement materials are in continuous forms such as rolls of fiberglass mat or doffs of fiberglass roving. The two ways to impregnate, or "wet out", the glass are open bath process and resin injection. Typical commercial resins include polyester, vinyl esters, phenolics, and epoxy compounds. These resins usually have very long gel times and can be run in an open bath process in which the reinforcing fibers are soaked in a bath of resin and the excess resin is scraped off by a series of preform plates and at the die entrance. As the wetted fibers enter the die, the excess resin is squeezed through and off the reinforcing fibers. The pressure rise in the die inlet helps to enhance fiber wet-out and suppresses void formation. As the saturated reinforcements are pulled through the die, the gelation (or hardening) of the resin is initiated by heat from the die and a rigid, cured profile that corresponds to the shape of the die is formed.

For resin systems like polyurethanes which have a fast gel time and a short pot life the resin injection process is used. In the injection process, the reinforcement materials are passed through a small closed box which is usually attached to the die or may be part of the die. The resin is injected under pressure through ports in the box to impregnate the reinforcement materials. Resin injection boxes are designed to minimize resin volume and resin residence time inside the box. There are a number of different resin injection box designs in the literature all of which have the common features of an angled or tapered design and the exit profile matching the shape of the die entrance.

The patent literature provides a number of teachings with respect to polyurethane pultrusion. For example, U.S. Pat. No. 6,420,493, issued to Ryckis-Kite et al., discloses a two component chemically thermoset composite resin matrix for use in composite manufacturing processes. The matrix includes a solvent-free polyisocyanate component and a solvent-free polyol component. The solvent-free polyisocyanate component is taught to be an aromatic polyisocyanate, an aliphatic polyisocyanate or a blend of both. The disclosed solvent-free polyol component is a polyether polyol, a polyester polyol or a blend of both. The polyisocyanate component and the polyol component are said to be in relative proportions in accordance with an OH/NCO equivalent ratio of 1:1 to 1:2. Ryckis-Kite et al. require the presence of 10%-40% of a polyester polyol with the use of 5 to 20 wt. % of a hydroxyl terminated vegetable oil also being taught. For the isocyanate component, Ryckis-Kite et al. state that it is preferred to have at least 15 wt % of an aliphatic polyisocyanate.

Cheolas et al., in U.S. Pat. No. 6,793,855, teach polyisocyanurate systems, pultrusion of those systems to produce reinforced polyisocyanurate matrix composites, and the composites produced by that pultrusion process. The polyisocyanurate systems of Cheolas et al. include a polyol component, an optional chain extender, and an isocyanate. The polyisocyanurate systems are said to have extended initiation times of about 5 minutes to about 30 minutes at room temperature and to be capable of snap curing. Cheolas et al., at col. 8, lines 10-23, state that in their Type I polyisocyanurate systems, the polyol, chain extender and isocyanate may be varied to control the miscibility of the reaction mixture. Several methods designed to increase miscibility of the reaction mixture are disclosed. Cheolas et al. teaches that substantial polymerization of the polyurethane takes place in the impregnation die.

U.S. Pat. No. 7,056,976, issued in the name of Joshi et al., also discloses polyisocyanate-based reaction systems, a pultrusion process using those systems to produce reinforced matrix composites, and composites produced by that pultrusion process. The polyisocyanate-based systems are mixed activated reaction systems that include a polyol composition, an optional chain extender or crosslinker and a polyisocyanate. The polyisocyanate-based systems are said to exhibit improved processing characteristics in the manufacture of fiber reinforced thermoset composites via reactive pultrusion. Joshi et al. teach that gel times are the key parameter in polyurethane pultrusion.

In addition, Cheolas et al., in U.S. Published Patent Application No. 2004/0094859 A1, teach polyisocyanurate systems, pultrusion of those systems to produce reinforced polyisocyanurate matrix composites, and composites produced by that pultrusion process. The polyisocyanurate systems disclosed in this published application include a polyol component, an optional chain extender and an isocyanate. The polyisocyanurate systems are said to have extended initiation times of from about 5 minutes to about 30 minutes at room temperature, and are capable of being snap cured. Cheolas et al., like Joshi et al., teach that gel times are the key parameter in polyurethane pultrusion processes.

Polyurethane-forming systems currently being used to produce composites by pultrusion are generally based upon aromatic polyisocyanates. The physical properties of these systems are very good when used in applications where the composite is used indoors and is not therefore subject to weathering. However, these aromatic polyisocyanate-based systems do not perform well in unprotected outdoor applications. Poor weathering characteristics of the resin will result in color change, gloss loss and deterioration of the resin matrix and exposure of bare glass fibers (commonly referred to as "blooming").

Aliphatic isocyanate-based polyurethane-forming systems are known to have better weathering characteristics than the aromatic isocyanate-based systems. However, substitution of an aliphatic isocyanate for the aromatic isocyanate in known pultrusion systems produces composites with better weathering characteristics but inferior physical properties.

A need therefore exists for improved polyurethane formulations for use in pultrusion processes to produce composites with both excellent physical properties and excellent weathering properties.

SUMMARY OF THE INVENTION

It is an object of the present invention to provide a reaction system for the preparation of a fiber reinforced composite by a pultrusion process that includes an aliphatic polyisocyanate component to produce a fiber reinforced composite having excellent weathering properties and physical properties comparable to those of composites produced with aromatic isocyanate-based systems.

It is another object of the present invention to provide a reaction system for the preparation of a fiber reinforced composite by a pultrusion process that has good weathering, is clear in color and has a high glass transition temperature.

It is a further object of the present invention to provide a pultrusion process for the production of a fiber reinforced composite that has good weathering, is clear in color and has a high glass transition temperature.

It is an additional object of the present invention to provide composite articles having good weathering characteristics, are clear in color and have a high glass transition temperature.

These and other advantages and benefits of the present invention will be apparent from the Detailed Description of the Invention herein below are attained by the reaction system of the present invention which includes an aliphatic polyisocyanate component and an isocyanate-reactive component containing at least one low molecular weight amine-initiated polyether polyol having a functionality greater than 3.

DETAILED DESCRIPTION OF THE INVENTION

The present invention will now be described for purposes of illustration and not limitation. Except in the examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a reaction system for the preparation of fiber reinforced composites by a pultrusion process. These composites are made from continuous fiber reinforcing material and a polyurethane formulation containing a polyisocyanate component including at least one aliphatic polyisocyanate and an isocyanate-reactive component including at least one low molecular weight amine-initiated polyether polyol having a functionality greater than 3.

The present invention further provides a pultrusion process for the production of fiber reinforced polyurethane composites by (a) continuously pulling a roving or tow of continuous fiber reinforcing material successively through an impregnation chamber and a die, (b) continuously feeding a polyurethane formulation containing a polyisocyanate component including at least one aliphatic polyisocyanate and an isocyanate-reactive component including at least one low molecular weight amine-initiated polyether polyol having a functionality greater than 3 to the impregnation chamber, (c) contacting the fiber reinforcing material with the polyurethane formulation in the impregnation chamber in a manner such that substantially complete wetting of the material by the polyurethane formulation occurs, (d) directing the fiber reinforcing material through a die heated to reaction temperature to form a solid composite, and (5) drawing the composite from the die. In a preferred embodiment of the process of the present invention, the conditions in the impregnation chamber are such that substantially no polymerization takes place.

The isocyanate-reactive component of the polyurethane system of the present invention must include at least one low molecular weight (i.e., molecular weight from 150 to 410, preferably, from 240 to 300) colorless amine-initiated polyether polyol having a functionality greater than 3, preferably, from 3 to 5, more preferably from 4 to 5, most preferably, 4. Other polyols may be included in the isocyanate-reactive component, however, those polyols must be short chained, i.e., have a molecular weight less than 410, must be colorless and must have a functionality greater than 3.0. The required amine-initiated polyether polyol must be present in an amount of at least 20% by weight, preferably, at least 25% by weight, most preferably, at least 31% by weight, based on total weight of the isocyanate-reactive component.

Suitable low molecular weight, high functionality amine-initiated polyether polyols are commercially available. Specific examples of suitable amine-initiated polyether polyols are those sold under the names Quadrol by BASF and Multranol 9181 and Mutranol 9138 by Bayer MaterialScience.

Other polyols which may optionally be included in the isocyanate-reactive component of the present invention include any polyol having a molecular weight less than 410 that is colorless and has a functionality greater than 3, preferably, greater than 4. An example of such an optional polyol is that which is sold under the name Pluracol PEP 450 by BASF.

In some embodiments of the invention, the isocyanate-reactive component preferably contains a mixture of two or more organic polyols. The individual polyols preferably differ principally in regard to hydroxyl group functionality and molecular weight. In particularly preferred embodiments of the invention, the organic polyols in the isocyanate-reactive component include chain extenders, crosslinkers, and combinations thereof.

Suitable in the present invention are those polyols referred to the in the art as chain extenders and/or crosslinkers. Such polyols have molecular weights of 60 to less than 200 and isocyanate-reactive group functionalities of from 2 to 4, more preferably from 2 to 3. However, it is most preferred to minimize the amount or avoid chain extenders altogether in the present invention.

Examples of chain-extenders/crosslinkers are simple glycols and triols, such as ethylene glycol, propylene glycol, dipropylene glycol, 1,4-butanediol, 1,3-butanediol, triethanolamine, triisopropanolamine, tripropylene glycol, diethylene glycol, triethylene glycol, mixtures of these, and the like. The most preferred chain-extenders/crosslinkers are liquids at 25° C. Although aliphatic —OH functional compounds, such as those just listed, are the most preferred as chain-extenders/crosslinkers, it is within the scope of the invention to employ certain polyamines, polyamine derivatives, and/or polyphenols. Examples of suitable amines known in the art include diisopropanolamine, diethanolamine, and 3,5-diethyl-2,4-diaminotoluene, 3, 5-diethyl-2,6-diaminotoluene and mixtures thereof. Examples of suitable isocyanate-reactive amine derivatives include certain imino-functional compounds, such as those described in EP 0 284,253 and EP 0 359,456 and certain enamino-functional compounds such as those described in EP 0 359, 456 having 2 or more isocyanate-reactive groups per molecule. Reactive amines, especially aliphatic primary amines, are less preferred due to extremely high reactivity with polyisocyanates, but may optionally be used if desired in minor amounts.

It is also within the scope of the invention, albeit less preferred, to include within the isocyanate-reactive component minor amounts of other types of isocyanate-reactive species that may not conform to the types described hereinabove.

Among the benefits of the inventive formulations are: (1) the pultruded parts have a smoother surface in some embodiments which prevents defects from arising on the finished surface, especially those parts having complex profiles; (2) high glass transition temperature; (3) they are colorless; and (4) they may be used in outdoor applications because they have excellent weathering characteristics and excellent physical properties.

Further, in contradistinction to the teaching in the art, exemplified by the patents mentioned hereinabove that require a high degree of polymerization occur within the impregnation die, the present inventors find it desirable to have essentially no reaction occur inside of the impregnation die. Although the gel time of all resins, not just polyurethanes, is important, the inventors herein have determined that it is not the key factor in determining pultrusion processability.

Pultrusion of the inventive polyurethane formulations to produce fiber reinforced composites is preferably performed by feeding the polyisocyanate and isocyanate-reactive components to a metering machine for delivery in a desired ratio to produce a polyurethane-forming reaction mixture. The polyurethane-forming reaction mixture is fed to an injection die where it impregnates fibers being pulled concurrently into the injection die. The conditions in the injection die are such that little, or more preferably no polymerization of the polyurethane-forming reaction mixture will occur. The resulting uncured composite is pulled through a zoned heating die, attached directly to the injection die, having a desired cross-section where it is shaped and cured. The dynamic forces needed to pull the composite through the forming die are provided by a pulling machine which has gripping devices that contact the cured composite profile (or the glass fibers therein) and give the traction necessary to pull the composite profile through the die. The machine may also have a device that develops a force in the desired direction of pull that gives the impetus necessary to pull the composite profile continuously through the die. The resulting composite profile upon exiting the pulling machine may be cut to the desired length, for example, by an abrasive cut off saw.

A long fiber based reinforcing material provides mechanical strength to the pultruded composite, and allows the transmission of the pulling force in the process. Fibers should preferably be at least long enough to pass though both the impregnation and curing dies and attach to a source of tension. The fibrous reinforcing material suitable in the instant invention may be any fibrous material or materials that can provide long fibers capable of being at least partially wetted by the immiscible polyurethane formulation during impregnation. The fibrous reinforcing structure may be single strands, braided strands, woven or non-woven mat structures, combinations of these, or the like. Mats or veils made of long fibers may be used, in single ply or multi-ply structures. Suitable fibrous materials known in the pultrusion art, include, but are not limited to, glass fibers, glass mats, carbon fibers, polyester fibers, natural fibers, aramid fibers, nylon fibers, basalt fibers, combinations thereof. Particularly preferred in the present invention are long glass fibers. The fibers and/or fibrous reinforcing structures may be formed continuously from one or more reels feeding into the pultrusion apparatus and attached to a source of pulling force at the outlet side of the curing die. The reinforcing fibers may optionally be pre-treated with sizing agents or adhesion promoters as is known in the art.

The weight percentage of the long fiber reinforcement in the pultruded composites of the present invention may vary considerably, depending on the end use application intended for the composite articles. Reinforcement loadings may be from 30 to 95% by weight, preferably from 40 to 90% by weight of the final composite, more preferably from 60 to 90% by weight, and most preferably from 70 to 90% by weight, based on the weight of the final composite. The long fiber reinforcement may be present in the pultruded composites produced in the present invention in an amount ranging between any combination of these values, inclusive of the recited values.

In some embodiments of the present invention, the polyisocyanate component and the isocyanate-reactive component may be the only components that are fed into the impregnation die in the pultrusion process. The polyisocyanate component or the isocyanate reactive component may be premixed with any optional additives. However, it is to be understood that the optional additives that are not themselves polyfunctional isocyanate reactive materials are to be considered (counted) as entities separate from the isocyanate-reactive component, even when mixed therewith. Likewise, if the optional additives, or any part thereof, are premixed with the polyisocyanate component, these are to be considered as entities separate from the polyisocyanate component, except in the case where they are themselves polyfunctional isocyanate species.

The pultrusion apparatus preferably has at least one impregnation die and at least one curing die. Because no polymerization is to take place in the impregnation die, the curing die necessarily will operate at a higher temperature than the impregnation die. The pultrusion apparatus may optionally contain a plurality of curing dies, or zones. Different curing zones may be set at different temperatures, if desired, but all the zones of the curing die will be higher in temperature than the impregnation die. The pultrusion apparatus may optionally contain a plurality of impregnation dies. Preferably, there is just one impregnation die, and this preferably is situated immediately prior to the first curing die (or zone). As mentioned hereinabove, the impregnation die is set at a temperature that provides for substantially no reaction (polymerization) between the polyisocyanate component and the polyisocyanate-reactive component in the immiscible polyurethane formulation before the fibrous reinforcing structure, which has been at least partially impregnated with the immiscible polyurethane formulation, enters the first curing die (or zone).

Suitable aliphatic diisocyanates and polyisocyanates (collectively referred to as "polyisocyanates") for use in the polyurethane-forming reaction mixtures of the present invention are clear and colorless and have a viscosity at 25° C. of less than 1000 centipoise. Examples of such aliphatic polyisocyanates include those represented by the formula, $$Q(NCO)_n$$

in which n is a number from 2-5, preferably 2-3, and Q is an aliphatic hydrocarbon group containing 2-12, preferably 4-6, carbon atoms or a cycloaliphatic hydrocarbon group containing 4-6, preferably 5-6, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate); and dicyclohexylmethane-4,4'-diisocyanate (hydrogenated MDI, or HMDI). Those skilled in the art will recognize that it is also possible to use mixtures of the polyisocyanates described above.

In general, it is preferred to use readily available polyisocyanates, such as those based on HMDI and IPDI.

Isocyanate-terminated prepolymers may also be employed in the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The polyisocyanate component preferably contains organic polyisocyanates having a number averaged isocyanate (NCO) functionality of from at least 2 to 6, more preferably from 2 to 4, most preferably from 2 to 3. The NCO functionality of the polyisocyanate composition may be in an amount ranging between any combination of these values, inclusive of the recited values. The polyisocyanate composition preferably has a free isocyanate group content (NCO content) in the range of from 20% to 30% by weight, more preferably from 23% to 30%, most preferably from 23% to 26% by weight. The NCO content of the polyisocyanate composition may be in an amount ranging between any combination of these values, inclusive of the recited values.

The polyurethane-forming reaction mixture may optionally contain a catalyst for one or more of the polymer forming reactions of polyisocyanates. Catalyst(s), where used, is/are preferably introduced into the immiscible polyurethane formulation by pre-mixing with the isocyanate-reactive component. Catalysts for the polymer forming reactions of organic polyisocyanates are well known to those skilled in the art. Preferred catalysts include, but are not limited to, tertiary amines, tertiary amine acid salts, organic metal salts, covalently bound organometallic compounds, and combinations thereof.

Examples of preferred tertiary amine catalysts include triethylenediamine, N,N-dimethyl cyclohexylamine, bis-(dimethylamino)-diethyl ether, N-ethyl morpholine, N,N,N',N',N''-pentamethyl diethylenetriamine, N,N-dimethyl aminopropylamine, N-benzyl dimethylamine, and aliphatic tertiary amine-containing amides of carboxylic acids, such as the amides of N,N-dimethyl aminopropylamine with stearic acid, oleic acid, hydroxystearic acid, and dihydroxylstearic acid.

Examples of suitable tertiary amine acid salt catalysts include those prepared by the at least partial neutralization of formic acid, acetic acid, 2-ethyl hexanoic acid, oleic acid, or oligomerized oleic acid with a tertiary amine such as triethylenediamine, triethanolamine, triisopropanolamine, N-methyl diethanolamine, N,N-dimethyl ethanolamine, mixtures thereof.

Examples of preferred organic metal salts for use as catalysts include potassium 2-ethyl hexanoate (potassium "octoate"), potassium oleate, potassium acetate, potassium hydroxide, bismuth octoate, zinc neodecanoate, dibutyltin dilaurate, dibutyltin diacetate, and dibutyltin dioleate, and other organotin carboxylate catalysts.

Other metal-based catalysts, which are suitable for use in the invention, include zinc carboxylates, such as zinc stearate and zinc neodecanoate, and bismuth carboxylates.

Mixtures of tertiary amine, amine acid salt, organometallic, and/or metal salt catalysts may be used. The use of mixed catalysts is well known to those skilled in the art. It is sometimes desirable to include in the mixing activated chemical formulation one or more catalysts for the trimerization of isocyanate groups.

The levels of the preferred catalysts required to achieve the needed reactivity profile for pultrusion will vary with the composition of the formulation and must be optimized for each formulation. Such optimization is understood by persons of skill in the art. The catalysts preferably have at least some degree of solubility in the isocyanate-reactive compounds used, and are most preferably fully soluble in the isocyanate-reactive component at the use levels required.

The polyurethane formulation may contain other optional additives, if desired. These optional additives are preferably added to the isocyanate-reactive component prior to processing, although it is within the scope of the invention to premix all or any part of the optional additives package with the polyisocyanate component under the proviso that it does cause the polyisocyanate to self-react or otherwise interfere with pultrusion processing of the reaction system. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Internal mold release additives are highly preferred in pultrusion of mixing activated isocyanate based resins systems to prevent sticking or buildup in the die. Suitable internal mold release agents include, for example, fatty amides such as erucamide or stearamide, fatty acids such a oleic acid, oleic acid amides, fatty esters such as LOXIOL G71 S inert polyester (from Henkel), carnuba wax, beeswax (natural esters), butyl stearate, octyl stearate, ethylene glycol monostearate, ethylene glycol distearate, glycerin di-oleate, glycerin tri-oleate, and esters of polycarboxylic acids with long chain aliphatic monovalent alcohols such as dioctyl sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, silicones such as TEGO IMR 412T silicone (from Goldschmidt), KEMESTER 5721 ester (a fatty acid ester product from Witco Corporation), fatty acid metal carboxylates such as zinc stearate and calcium stearate, waxes such as montan wax and chlorinated waxes, fluorine containing compounds such as polytetrafluoroethylene, fatty alkyl phosphates (both acidic and non acidic types such as ZELEC UN, ZELEC AN, ZELEC MR, ZELEC VM, ZELEC UN, ZELEC LA-1, and ZELEC LA-2 phosphates, which are all commercially available from Stepan Chemical Company), chlorinated-alkyl phosphates; hydrocarbon oils, combinations of these, and the like. Especially preferred internal mold release agents are TECHLUBE 550HB available from Technick Products and 1948MCH available from Axel Plastics.

Suitable fillers include, for example, aluminum trihydrate, antimony oxide, milled glass fibers, wollastonite, talc, mica, flaked glass, titanium dioxide, micronized polyethylene and combinations thereof.

Other preferred optional additives for use in pultrusion processing of polyurethanes include moisture scavengers, such as molecular sieves; defoamers, such as polydimethylsiloxanes; coupling agents, such as the mono-oxirane or organo-amine functional trialkoxysilanes; combinations of these and the like. The coupling agents are particularly preferred for improving the bonding of the matrix resin to the fiber reinforcement. Fine particulate fillers, such as clays and fine silicas, are often used at thixotropic additives. Such particulate fillers may also serve as extenders to reduce resin usage.

Fire retardants are sometimes desirable as additives in pultruded composites. Examples of preferred fire retardant types include, but are not limited to, friaryl phosphates; trialkyl phosphates, especially those bearing halogens; melamine (as filler); melamine resins (in minor amounts); halogenated paraffins and combinations thereof.

The stoichiometry of mixing isocyanate-based polymer forming formulations, containing an organic polyisocyanate and a polyfunctional isocyanate reactive resin is often expressed by a quantity known in the art as the isocyanate index. The index of such a mixing activated formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Preferred index values in the inventive formulations range from 90 to 120%. A more preferred range of index values is from 105 to 110%.

As those skilled in the art are aware, pultrusion of polyurethane and polyisocyanurate systems with fiber reinforced composites is performed by supplying the polyisocyanate and isocyanate-reactive components to a mix/metering machine for delivery in a desired ratio to a mixing apparatus, preferably a static mixer, to produce a reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The curing die has two to three heated zones equipped with electrical heating coils individually controlled to maintain the desired temperatures. The entrance to the die is cooled to prevent premature polymerization. The temperature at the hottest zone generally ranges from about 350° F. to about 450° F. The dynamic forces needed to pull the composite through the forming die are supplied by the pulling machine. This machine typically has gripping devices that contact the cured composite profile (or the glass fibers therein) and give the traction necessary to pull the composite profile through the die. The machine also has a device that develops a force in the desired direction of pull that gives the impetus necessary to pull the composite profile continuously through the die. The resulting composite profile upon exiting the pulling machine is then cut to the desired length typically by an abrasive cut off saw.

EXAMPLES

The present invention is further illustrated, but is not to be limited, by the following examples. All quantities given in "parts" and "percents" are understood to be by weight, unless otherwise indicated. The following materials were used in the formulations of the examples:

POLYOL A: A propylene oxide-based polyether polyol having a functionality of three and a molecular weight of 700 which is commercially available from Bayer MaterialScience LLC under the name ARCOL LHT-240.

POLYOL B: A polypropylene oxide-based triol having a molecular weight of 160 which is commercially available from Bayer MaterialScience LLC under the name MULTRANOL 9133.

POLYOL C: An amine-based polyether triol having a molecular weight of 240 which is commercially available from Bayer MaterialScience LLC under the name MULTRANOL 9138.

POLYOL D: A propylene oxide-based triol having a molecular weight of 356 which is commercially available from Bayer MaterialScience LLC under the name MULTRANOL 9158.

POLYOL E: An amine-based tetra-functional polyether polyol having a molecular weight of 360 which is commercially available from Bayer MaterialScience LLC under the name MULTRANOL 4050.

POLYOL F: A tetra-functional amine-based polyether polyol having a molecular weight of 290 which is commercially available from Bayer POLYOL G: A pentaerythritol-based polyether polyol having a molecular weight of 408 which is commercially available from BASF under the name Pluracol PEP 450.

B75: A light stabilizer system which is commercially available from BASF under the name TINUVIN B75.

1948 MCH An internal mold release agent composed of a blend of fatty acid compounds and commercially available from Axel Plastics as AXEL INT 1948 MCH.

PPG 4000: A polypropylene glycol having a molecular weight of 4,000 which is commercially available under the name ARCOL PPG 4000 from Bayer MaterialScience LLC.

KA 451 A dispersion of a Zeolith powder in a polyol produced by Bayer MaterialScience LLC called BAYLITH BLEND KA 451.

DBU: 1,8-diazabicycloundec-7-ene which is commercially available under the name Dabco DBU.

UL-29: A tin catalyst which is commercially available under the name FOMREZ UL-29 from Momentive.

UL-38: A tin catalyst which is commercially available under the name of Fomrex UL-38 from Momentive.

ISO A: An HDI-based polyfunctional aliphatic polyisocyanate having an NCO content of 23% which is commercially available from Bayer MaterialScience LLC under the name DESMODUR N3600.

ISO B: An HDI-based polyfunctional aliphatic polyisocyanate having an NCO content of 23% which is commercially available from Bayer MaterialScience LLC under the name DESMODUR N3200.

ISO C An IPDI based polyfunctional aliphatic polyisocyanate having an NCO content of 26% which is commercially available from Bayer Material Science under the name DESMODUR 77ZRT.

ISO D An HDI based polyfunctional aliphatic polyisocyanate having an NCO content of 26% which is commercially available from Bayer Material Science under the name of BAYTEC WP 260.

ISO E: An aromatic polymeric isocyanate based on diphenylmethane diisocyanate having an NCO content of 31% which is commercially available from Bayer MaterialScience LLC under the name Mondur MR.

Pultrusion Process

The composites produced in the Examples which follow were produced by the following procedure.

A nominal 5"×0.100" rectangular profile reinforced with 68% unidirectional E-glass by volume (125 ends of type 30 113 yield roving) was pultruded in all of the Examples presented below. The pultruded articles described in the Examples below were conducted at a commercial pultruder using commercial pultrusion equipment with a resin injection chamber in front of the die. The front of the die was water cooled, and three-zones of platen heat were used to cure the composite. The pultruded product was produced at a pull speed of 22 in/min. Processing data including measured line speed, pull load, and die temperatures were recorded using a computer data acquisition system during the pultrusion process. When changing from one resin to the next, dry fiber was pulled through the die to ensure that no mixing of the three resin systems occurred.

Comparative Examples 1 and 2

The formulation for Comparative Example 1 represents a typical aromatic polyisocyanate-based polyurethane forming system used to produce composites by a pultrusion process.

The formulation for Comparative Example 2 includes the same polyol component that was used in Comparative Example 1 with the exception that the aliphatic polyisocyanate which is sold commercially under the name Desmodur N3600 by Bayer Material Science, was substituted for the aromatic polyisocyanate sold by Bayer MaterialScience under the name Mondur MR.

The specific composition of the polyurethane-forming systems used in Comparative Examples 1 and 2 and the physical properties of pultruded composites produced with these formulations are given in Table 1 below. The percentages given for the components listed in Table 1 are percentages by weight, based on total weight of the isocyanate-reactive component.

TABLE 1

|  | Example | |
| --- | --- | --- |
|  | 1 | 2 |
| POLYOL A % | 27.1 | 27.1 |
| POLYOL B % | 22.6 | 22.6 |
| POLYOL D % | 22.6 | 22.6 |
| 1948 MCH % | 5.4 | 5.4 |
| PPG 4000 % | 18.1 | 18.8 |
| KA 451 % | 3.6 | 3.6 |
| DBU % |  |  |
| UL-29 % | 0.6 | 0.6 |
| ISO A % |  | 100 |
| ISO E % | 100 |  |
| Mix Ratio Iso/Polyol (pbw) | 105/100 | 150/100 |
| Flex Modulus [psi] | 7000000 | 2000000 |
| Shear Strength [psi] | 9000 | 3500 |
| Elongation [%] | 2 | 1.5 |

TABLE 1-continued

|  | Example | |
| --- | --- | --- |
|  | 1 | 2 |
| Tensile Strength [psi] | 200000 | 75000 |
| Color | Tan | clear |

As can be seen from the data presented in Table 1, mere substitution of an aliphatic polyisocyanate for an aromatic polyisocyanate in the polyurethane-forming system did not produce a composite with acceptable physical properties.

Examples 3-6

Composite articles were produced using the pultrusion process described above and the formulations described in Table 2. The percentages reported for the components listed in Table 2 are percentages by weight, based on total weight of the isocyanate-reactive component. The properties of these composites are also reported in Table 2.

TABLE 2

|  | Example | | | |
| --- | --- | --- | --- | --- |
|  | 3* | 4 | 5* | 6 |
| POLYOL B % | 21.3 | 21.3 | 21.3 | 21.3 |
| POLYOL F % | 28.3 | 28.3 | — | 28.3 |
| POLYOL C % | — | — | 28.3 | — |
| POLYOL G % | 37.8 | 37.8 | 37.8 | 37.8 |
| KA 451 % | 3.76 | 3.76 | 3.76 | 3.76 |
| B 75 % | 2.84 | 2.84 | 2.84 | 2.84 |
| 1948 MCH % | 6.6 | 6.6 | 6.6 | 6.6 |
| DBU % | 0.58 | 0.58 | 0.58 | 0..58 |
| UL 38 % | 0.20 | 0.20 | 0.20 | 0.20 |
| ISO B % | 100 | — | — | — |
| ISO C % | — | 100 | 100 | — |
| ISO D % | — | — | — | 100 |
| Mix Ratio Iso/Polyol [pbw] | 220/100 | 190/100 | 195/100 | 190/100 |
| Tg [° C.] | 51 | 117 | 112 | 100 |
| Color | clear | clear | yellow | clear |
| Flex Modulus [psi] | 2400000 | 7640000 | 7500000 | 7340000 |
| Flex Strength [psi] | 125000 | 145000 | 130000 | 141000 |
| Shear Strength (psi) | 7000 | 11000 | 10500 | 9800 |
| Tensile Modulus [psi] | 1200000 | 8100000 | 7500000 | 7500000 |
| Tensile Strength [psi] | 111000 | 125000 | 125000 | 120000 |
| Elongation [%] | 1.8 | 2 | 2 | 2 |

*Comparative Example

It can be seen from the results reported in Table 2 that an entirely new formulation was needed to achieve desired physical properties when an aliphatic isocyanate is used in the polyurethane-forming system.

Example 3 illustrates that an aliphatic isocyanate with a % NCO in range of 20-23% is not satisfactory even with a modified polyol formulation and that a higher % NCO content in the aliphatic isocyanate is needed.

Examples 4-6 illustrate polyurethane-forming systems that utilize aliphatic isocyanates having NCO contents of 26%. These Examples illustrate that physical properties meeting and even exceeding the properties of the aromatic polyisocyanate-based system used in Example 1 can be attained using an aliphatic isocyanate-based system. Although Example 5 possesses excellent properties, the yellow color of the resin base would limit its use in applications and makes a pure white color unobtainable.

We have shown that chemistry based on aromatic polyurethane systems is not suitable alone to produce a high property aliphatic based pultrusion systems. Substituting an aliphatic isocyanate produces materials with very low Tg values. A careful choice of polyols and isocyanates can be used to produce an aliphatic system which possesses properties equal or better than the aromatic including Tg.

Another important requirement for an aliphatic isocyanate-based system is improved weathering. The formulations described in Examples 4 & 6 above both produced polyurethanes with excellent weathering characteristics. Evaluation of weathering resistance takes into account several features of the polyurethane product. Color fastness or color shift and reinforcement blooming are two significant features in such evaluation. Accelerated weather testing was conducted using a Zenon Arc weatherometer. Table 3 reports the results of this accelerated weather testing for the aliphatic system of Example 6 that was applied to a white pigmented substrate to exemplify the most difficult color shift and the aromatic system of Example 1 that was applied to a black pigmented substrate to give it an optimum chance of success.

TABLE 3

| System/Exposure Time | Color Shift Delta E | Surface Fiber bloom |
|---|---|---|
| Aromatic black 500 hours | 10 | Surface bloom chalky matte surface |
| Aromatic black 1000 hours | 2 | Severe Surface Bloom chalky matte surface |
| Aromatic black 2000 hours | 7 | Glass entirely exposed |
| Aliphatic white 500 hours | 1.1 | No change in appearance smooth surface |
| Aliphatic white 1000 hours | 1.8 | No change smooth surface |
| Aliphatic white 2000 hours | 2.2 | No change smooth surface |
| Aliphatic white 3000 hours | 2.8 | No change smooth surface |
| Aliphatic white 5000 hours | 3.0 | No change smooth surface |
| Aliphatic white 7000 hours | 3.1 | Surface smooth some fibers visible |

The aromatic system of Example 1 showed a significant color shift even in a black color in the accelerated aging testing. Acceptable color shift changes are usually in the Delta E range of 3-5. In addition the aromatic polyurethane system after only 500 hours of exposure exhibited surface bloom which will expose the glass fibers in an article produced by a pultrusion process.

The aliphatic system of Example 6 even when applied to the more difficult white substrate showed excellent color retention after 7000 hours of accelerated weathering conditions. In addition the surface remained smooth throughout the testing.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A pultrusion process for preparing a fiber reinforced polyurethane composite comprising:
   (a) continuously pulling a roving or tow of continuous fiber reinforcing material successively through an impregnation chamber and a die;
   (b) continuously feeding a polyurethane-forming system to the impregnation chamber;
   (c) contacting the fiber reinforcing material with the polyurethane-forming system in the impregnation chamber such that substantially complete wetting of the material by the formulation occurs;
   (d) directing the fiber reinforcing material through a die heated to reaction temperature to form a solid composite; and
   (e) drawing the composite from the die,
   wherein the polyurethane-forming system comprises:
      (1) a clear, aliphatic polyisocyanate having a viscosity at 25° C. of no more than 1000 centipoise, and
      (2) an isocyanate-reactive component comprising:
         (i) a colorless amine-initiated polyol having a molecular weight of from about 150 to about 400 and an OH functionality greater than or equal to 3,
         (ii) a colorless pentaerythritol-initiated polyol having a molecular weight less than 410 and a functionality greater than 3, and
         (iii) a polyol having a molecular weight of 60 to less than 200 and an isocyanate-reactive group functionality of 2 to 4,
      (3) a catalyst,
   wherein the fiber reinforced polyurethane composite is clear, and
   wherein one impregnation chamber is used in the process.

2. The pultrusion process of claim 1 in which the fiber reinforcing material is selected from the group consisting of single strands, braided strands, woven mat structures, non-woven mat structures and combinations thereof.

3. The pultrusion process of claim 1 in which the fiber reinforcing material comprises one or more of glass fibers, glass mats, carbon fibers, polyester fibers, natural fibers, aramid fibers, basalt fibers and nylon fibers.

4. The pultrusion process of claim 1 in which the fiber reinforcing material comprises glass fibers.

5. The pultrusion process of claim 1 in which the clear, aliphatic polyisocyanate having a viscosity at 25° C. of no more than 1000 centipoise is based on 1-isocyanato-3,3,5-trimethyl-5-isocyanatomethyl-cyclohexane and/or dicyclohexylmethane-4,4'-diisocyanate.

6. A clear fiber reinforced polyurethane composite made by the process of claim 1.

7. The pultrusion process of claim 1, wherein the amine-initiated polyol having a molecular weight of from about 150 to about 400 has an OH functionality of at least 4.

8. The pultrusion process of claim 7, wherein the amine-initiated polyol is present in an amount of at least 20% by weight, based on the total weight of the isocyanate-reactive component.

9. The pultrusion process of claim 7, wherein the polyols of the isocyanate-reactive component consist essentially of colorless polyols having a molecular weight less than 410 and a functionality of at least 3.

10. The pultrusion process of claim 1, wherein the clear, aliphatic polyisocyanate having a viscosity at 25° C. of no more than 1000 centipoise is based on HMDI.

11. The pultrusion process of claim 1, wherein the clear, aliphatic polyisocyanate having a viscosity at 25° C. of no more than 1000 centipoise is based on IPDI.

12. The pultrusion process of claim 8, wherein the amine-initiated polyol having a molecular weight of from about 150 to about 400 and an OH functionality of at least 4 is present in an amount of at least 25% by weight, based on the total weight of isocyanate-reactive component.

13. The pultrusion process of claim 1, wherein conditions in the impregnation chamber are such that substantially no polymerization takes place.

14. The pultrusion process of claim 1, wherein the amine-initiated polyol has a molecular weight of from about 150 to about 300 and an OH functionality of 4 to 5.

15. The pultrusion process of claim 1, wherein the catalyst consists of:
    (1) one tin catalyst; and
    (2) a tertiary amine catalyst.

16. The pultrusion process of claim 15, wherein the tertiary amine catalyst comprises:
    (a) 1,8-diazabicycloundec-7-ene, and
    (b) N-benzyl dimethylamine.

17. The pultrusion process of claim 1, wherein:
    (i) the colorless amine-initiated polyol comprises a tetra-functional amine-based polyether polyol having a molecular weight of 290;
    (ii) the colorless pentaerythritol-initiated polyol has a functionality of 4, and
    (iii) the polyol having a molecular weight of 60 to less than 200 and an isocyanate-reactive group functionality of 2 to 4 comprises a polypropylene oxide-based triol having a molecular weight of 160.

* * * * *